April 14, 1942.   C. O. BROWNE ET AL   2,279,555
OPTICAL IMAGE PRODUCING AND VIEWING ARRANGEMENT
Filed July 30, 1938
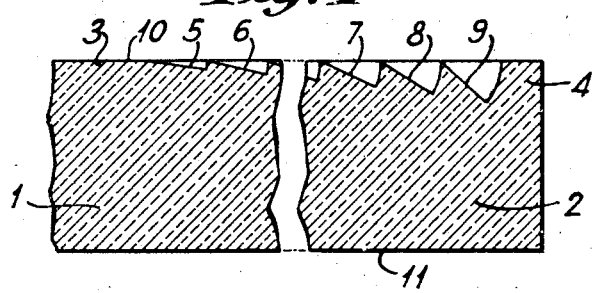
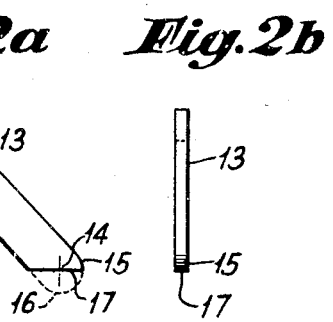
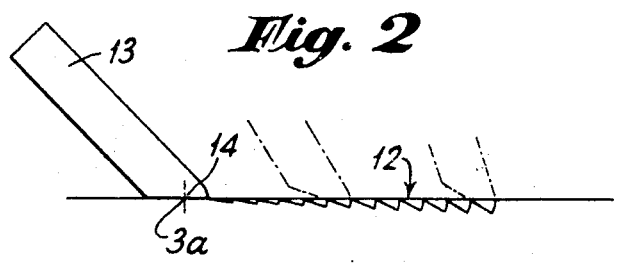
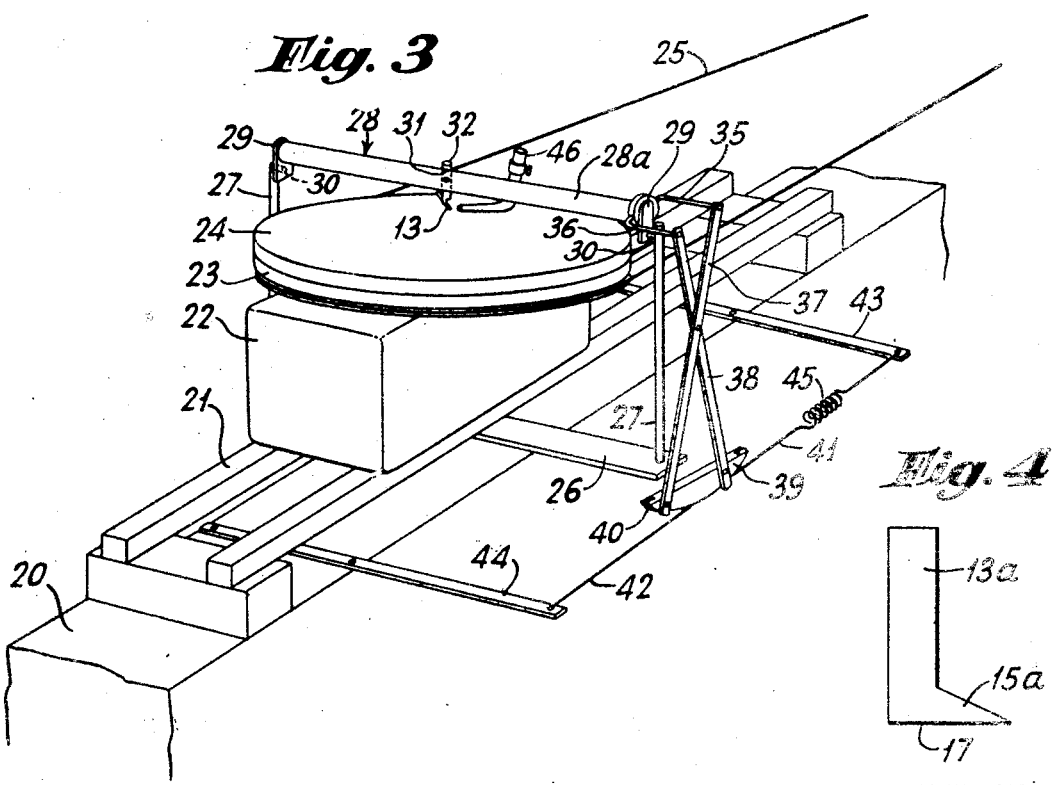
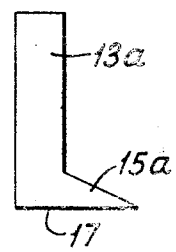
INVENTOR.
CECIL OSWALD BROWNE
HERBERT EDWARD HOLMAN
BY
ATTORNEY.

Patented Apr. 14, 1942

2,279,555

UNITED STATES PATENT OFFICE 2,279,555

OPTICAL IMAGE PRODUCING AND VIEWING ARRANGEMENT

Cecil Oswald Browne, West Acton, London, and Herbert Edward Holman, Hayes, England, assignors to Electric & Musical Industries Limited, Hayes, Middlesex, England, a company of Great Britain Application July 30, 1938, Serial No. 222,120
In Great Britain July 31, 1937

3 Claims. (Cl. 88—24)

The present invention relates to methods of and means for making sheets or screens of optically transparent or reflecting material having lenticular elements distributed over their surfaces.

In the present specification, by the term "lenticular element" is meant an element having the form of a lens or an element co-operating with a plurality of other elements arranged in the same surface to constitute a lens as in the case of lenses of the Fresnel type. For example, a sheet or screen may have distributed over its surface, co-operating lenticular elements each providing an element of a lens surface such that the whole sheet constitutes a Fresnel type lens or the lenticular elements may be formed in such manner that the sheet is rendered diffusing, the separate lenticular elements each causing the dispersion of light predominantly in certain desired directions. The lenticular elements will usually be formed as ribs or by grooving the surface on or in which they are produced or the elements may be constituted by nodules or depressions distributed over the surface.

Sheets of material provided with lenticular elements as above described are in some cases hereinafter referred to as "lenticulated" sheets.

The invention has been developed mainly in connection with arrangements for projecting and viewing optical images, such as are employed in television receivers, wherein a small image is produced on the end of a cathode ray tube, this image being projected with enlargement and viewed on a suitable receiving screen.

In such an arrangement a difficulty is experienced when a translucent or reflecting receiving or viewing screen is used, in that if the screen is appreciably directional a bright illuminated region of the picture is seen in line with the optical projection system, which forms the optical image on the viewing screen, while the remainder of the picture appears much less bright.

To overcome this difficulty an optical projection system has previously been used comprising a spherical lens, which is usually arranged at or near the plane of the projected image, which lens condenses the illumination in a comparatively narrow beam in the direction from which the image is to be observed. In general, as the lens by itself may only provide a completely illuminated picture when viewed from a restricted area at a point conjugate to the projection optical system, usually a diffusing viewing screen will be placed at or near the condensing lens to receive the image to be viewed.

In cases where an image of considerable size is to be projected, for example, in a particular case of a television system, an image of about eighteen by twenty-two inches in area may be required, the provision of a condensing lens of sufficient size becomes difficult, and the lens itself becomes expensive to make.

Thus it is convenient, in the case of a television receiver to provide a viewing arrangement in which the lens is replaced by a transparent sheet or screen provided with lenticular elements in the manner described for example, in British Patent Specification No. 371,893, in connection with diascopic cinematograph projection screens.

One object of the present invention is to provide a method suitable for use in the mass production of sheets of material having accurately worked lenticular elements formed in their surfaces.

A further object of the invention is to provide improved methods and arrangements for engraving surfaces to form therein lenticular elements or positive or negative copies thereof.

According to the invention, a method of making sheets of material having lenticular elements formed in their surfaces is provided which comprises the step of engraving or otherwise producing in the surface of a relatively soft body such as wax, a negative or positive copy of the desired lenticulated surface of a sheet and deriving from the engraved soft body, dies by which positive copies of the said lenticulated surface may be produced in material capable of receiving the desired impression. The invention contemplates the copying of the wax engraving by the methods used in the manufacture of gramophone records, the desired lenticulated sheets being derived by stamping or pressing positive or negative copies of the engraving in sheets of suitable thermoplastic transparent material. In some cases, the engraved soft material may be hardened to form a pressing die directly.

In a preferred embodiment of the invention, in the wax engraving process a tool cuts a spiral groove or concentric grooves of required shape in the wax, and the inclination of the tool is varied as the radius of the groove being cut increases to cause the lenticulations in the impressed sheet derived from the engraving to produce the effect of a lens having a desired characteristics, an impressed sheet thus constituting a Fresnel type lens.

The angle of the tool can be controlled automatically by means of a cam, tilted bar or other method and the form of the lenticulations may be "figured" or corrected locally as described by controlling the amount of tilt of the cutting tool. By applying a suitable motion to the master or tool during the cutting process the lenticulations may be arranged to produce the effect of an elliptical lens.

Preferably a form of the engraving tool is such, that in the finished lenticulated sheet there is little or no light wastage.

The nature of the invention and the manner in which it may be carried into practice will be fully understood from the following description reference being made by way of example to the accompanying drawing in which Figure 1 is an enlarged sectional view of a part of a lenticulated sheet made according to the invention, and constituting a Fresnel type lens, the section being taken along part of a diameter of the lens, Figure 2 is an enlarged view of a wax matrix showing the point of the engraving tool and illustrating the way in which the inclination of the tool to the surface of the wax is varied as the radius of cut increases, Figure 2a is a side elevational view of the engraving tool shown in Figure 2.

Figure 2b is a front elevational view of the engraving tool shown in Figure 2.

Figure 3 shows a diagrammatic view of a machine in which the wax positive shown in Figure 2 may be engraved, and Figure 4 shows a view similar to that of Figure 2a of another form of cutter which may be employed in a method according to the invention.

Referring to Figure 1 of the said drawing, two sections, 1 and 2 respectively of the lenticulated sheet are shown, section 1 being taken in the region about the centre 3 of the lens and section 2 being taken near the periphery 4 of the lens. The scale of the drawing is very large, a lenticulated sheet made by the method of the invention usually having a spiral groove comprising more than twenty turns to the inch and in some cases it may have as many as two hundred or more turns to the inch depending on the optical quality required. In the section of lenticulated sheet represented, a number of turns of the groove are numbered 5 to 9 respectively, and there is a central region 10 in which the front of the lens is parallel to the back surface 11. The inner sloping face which extends from the bottom of the groove towards the centre forms a lenticular surface and the progressively varying inclinations of this surface to the back 11 of the sheet from the centre outwards, causes the sheet to act as a lens. The shape of the other surface of the groove which will be referred to as the outer surface of the groove will depend on the shape of the instrument used in engraving the original matrix from which lens stampers are obtained and will be referred to more fully below. In the case of Figure 1 the outer surface of the groove is shown as one in which each elemental part has a centre of radius at the top of the inner surface of the groove.

Figure 2 illustrates the action of a preferred engraving tool in engraving a wax matrix for use in deriving stampers for producing lenticulated sheets according to the present invention. In Figure 2 the wax surface is shown at 12, and 13 is the engraving tool, 3a being the centre of rotation of the wax and corresponding to the point 3 of Figure 1. The engraving tool 13 is shown separately in Figures 2a and 2b. This tool is formed from a piece of sapphire of substantially parallelopiped form having small thickness, by rounding one end about a centre 14 (see Figure 2a) as shown by the surface of the nose portion 15 of the tool and the dotted continuation of the tool profile at 16. After the tool has been rounded, the flat surface 17 preferably lying in the plane of greatest strength of the sapphire, is formed on the tool, this surface including the centre of radius 14 of the nose portion 15.

In engraving the wax matrix, the sapphire 13 is first applied with its radius centre 14 resting on the centre of rotation 3a of the wax and the surface 17 flat on the wax. The wax is then caused to rotate at the requisite speed for cutting and the tool 13 is traversed radially of the wax, the inclination of the tool 13 being varied to produce a spiral groove having the inner surface inclined in the desired manner, referred to above, by rocking the tool about the centre 14.

With the form of and method of using the tool described above a number of advantages are obtained. If the engraving is effected with a right-angled tool which is canted over as the outer edge of the wax is approached, the extent of the outer surface of the groove in the radial direction of the wax face will be considerable, and if the angle of cant exceeds 45° the outer surface of the groove would extend further radially than the inner surface. As, in the finished sheet, only the inner surface of the groove is useful optically, the radial extent of the outer surface of the groove represents light wastage and for a sheet of good transmission efficiency, this radial extent should be kept small.

If a tool were used having a smaller cutting angle than 90° the above defect might be eliminated and satisfactory results secured in the outer portion of the engraving. However, in cutting a spiral groove with a single tool of small cutting angle, the groove will be undercut in the central region of the engraving and this will both cause loss of efficiency and render the engraving impossible of reproduction without destroying the matrix or stamper in each case. Thus, if the spiral groove is to be retained, whereby a time economy may be effected, it is preferable either to use two tools having acute cutting angles for example of 45°, one tool cutting the inner face of the groove and the other tool cutting the outer face, or to make a compromise and use a tool such as 13 of Figures 2 to 2b. In this case, as the flat 17 on the tool passes through the centre of radius 14 of the nose portion 15 of the tool, and the tool is rocked about centre 14, the cutting angle of the tool will be 90° and the surface of the nose 15 where it emerges from the wax will always be normal to the surface of the wax so that there will be no undercutting so that the groove form can be faithfully copied throughout its length. The light wastage produced with a tool such as 13, is roughly half that obtained with a simple rectangular cutting tool.

It will of course be appreciated that the tool 13 may not have a regular form except in respect of surface 17, and its nose 15, the only condition being that the rest of the tool shall not enter the wax as the tool is canted over.

A suitable machine for making an engraving for use according to the invention is shown diagrammatically in Figure 3. As shown the machine comprises a bed 20 carrying a track 21 over which is supported a housing 22 for the spindle and associated gearing (not shown) of a turntable 23 carrying a wax disc 24 of which the surface may be shaved plane in situ or the wax may be melted and caused to flow over a shallow tray to provide a plane surface. The wax disc 24 may be suitably driven for example by means of a belt 25 from a suitable motor (not shown), the speed being controlled manually accordingly as the radius of the spiral groove being cut increases. The cutting tool 13 is carried by a traversing carriage comprising base member 26, uprights 27 and the transverse support 28 this carriage being moved along the track 21 by means actuated through gearing in the housing 22, in accordance with the rotation of turntable 23.

The transverse support 28 is shown as consisting of a heavy bar 28a, supported on two lugs 29, pivotally connected at 30 to the ends of uprights 27 so that the bar 28a can be rocked about an axis lying in the surface of the shaved wax disc 24. The bar 28a is apertured at 31 to receive a holder 32 for tool 13. The cutting tool 13 is arranged so that the radius centre 14 lies in the plane of the surface of the wax disc 24 on the rotational axis of the bar 28a, the surface 17 (see Figure 2) of the tool lying on the wax surface when the tool is at the rotational centre of the disc. One end of the bar 28a has attached to it arms 35 and 36 secured to a pair of crossed rods 37 and 38 secured at their lower ends to a cam member 39 which may have an arcuate surface as shown at 40, each end of member 39 being secured to one end of a wire 41 or 42 which is anchored to supporting rod 43 or 44, mounted on the bed 20, the wires 41 and 42 being maintained under tension by providing spring means such as 45 in or on the end of wire 41 or at any other suitable point. Wax suction or blowing means 46 for removing the wax cut away by tool 13 may be provided as indicated.

In operation of the machine turntable 23 is driven at the appropriate speed to rotate wax disc 24 against tool 13 and simultaneously the carriage comprising the bar 28a is traversed relative to the surface of the wax disc 24 thereby traversing the bar 28a and tool 13 across this surface, as the wax disc rotates. As the bar 28a is traversed it will be seen that the inclination of the cam member 39 will be varied due to the action of the wires 41 and 42, the movement of the member 39 being transmitted through rods 38 and 37 to members 35 and 36 and thence through bar 28a and holder 32 to the tool 13, the bar 28a and its attachments rotating about pivots 30. Thus the inclination of the surface 17 of the tool 13 to the wax will vary progressively in accordance with the form of surface 40 of cam member 39, as the disc 24 rotates and the inner surface of the groove cut by the tool 13 will be varied accordingly. Thus by making the surface 40 of cam member 39 of suitable form, the inclination of the groove surface may be caused to vary in any desired manner.

If the rods 37 and 38 are symmetrically arranged and the cam surface 40 is arcuate then the inclination surface 17 of the tool 13 to the surface of the wax disc 24 will be proportional to the displacement of the tool from the rotational centre of the disc. However, by connecting cam member 39 asymmetrically with the rods 37 and 38 the variation in the inclination of the tool might be arranged to follow, for example, a hyperbolic law.

Also, of course, it will be appreciated that various arrangements might be used instead of the arrangements including the rods 37 and 38 and cam member 39, as for example, there might be a suitably shaped cam surface to extend parallel to the direction of travel of the tool 13, this cam acting directly on the tool support to give the desired change of inclination.

In the case of a television receiver for domestic use the effective curvature of the lens constituted by the lenticulated sheet is preferably such that the focal length of the lens is two and a half to three feet to give reasonable size of cabinet, though as a diffusing screen is normally associated or formed by the lenticulated sheet, the focal length of the lens will not be critical. However, as the focal length of the lens is relatively short compared with its aperture, the inclination of the inner face of the groove required in the outside turns of the groove may become very large, and it may, in these circumstances, be preferable to lenticulate both sides of a transparent sheet or to provide two transparent sheets each of which represents a different lens of less curvature than the lens equivalent to the combination. For example two co-operating lenticulated surfaces may be formed according to the invention, one surface having a groove formed in it with an increasingly inclined inner surface up to a certain radius from the centre after which the inclination of the inner surface remains constant, and the other surface being plane or having the inclination of the inner surface of its groove constant up to the radius at which the inclination of the inner surface of the groove in the first surface becomes constant, the inclination of the inner surface of the groove in the second surface being then varied to give the required refraction of the light passing through the combination of lenticulated surfaces. The two co-operating lens surfaces may be conveniently formed on a single sheet of transparent material by impressing the sheet on both sides as in the case of a double sided phonograph record. If desired, of course, in the case of an episcopic arrangement the effect of two co-operating lens surfaces may be obtained by rendering the plane obverse surface of the sheet reflecting, the front lenticulated surface being used twice over.

It will also be appreciated that instead of cutting a spiral groove as described, concentric grooves might be cut. In this case a tool 13a of the form shown in Figure 4 might be used having a straight edged nose portion 15a making a sharp cutting angle with the face 17. This tool might be stabbed slowly into the wax to the required depth as the wax rotates, the inclination of the tool for each cut being adjusted in any convenient way either manually or automatically. The grooves obtained in this manner would have vertical outer surfaces and lenses could be derived from the engraving having a maximum optical efficiency.

As already indicated, the engraved wax matrix is duplicated, for example, by any of the methods of electro-typing used in the process of making gramaphone records, and stampers are obtained from the wax positive which are used in pressing sheets of transparent material. If the sheets are to be used in a episcopic arrangement instead of diascopic arrangement they may be pressed in any suitable material either transparent or opaque, and the grooved surface coated with a reflecting layer, for example, silver, if it is not already sufficiently reflecting.

The thickness of the sheet material in which the lenticular impressions are made may be great enough for the sheet to be self-supporting or the sheet may be so thin as to require additional support. This support might be afforded by cementing the thin sheet to a sheet of transparent or translucent material, for example, glass, the surface of which might be rendered diffusing by sand blasting or by any other suitable means. If desired, the diffusing surface of the supporting member may be rendered directional.

The diffusing surface may be obtained by using a transparent material of which the surface is finely divided into minute spherical lenses. Glass having a diffusing surface approximating to that required is made commercially but may be improved upon by ruling it with a system of horizontal and vertical grooves the shape and cross section and the number of grooves in each direction being chosen to suit the required distribution of light to viewers.

If desired, and more especially in the case of the diascopic sheet produced according to the invention, a system of crossed grooves may actually be incorporated when cutting the wax engraving.

It will be seen that owing to the fact that in the method of the invention the lenticulated sheets are produced by known methods of duplicating engravings in soft materials such as a wax matrix an extremely large number of sheets can be produced at low cost as the result of a single engraving operation. Thus it is possible to employ a very lengthy and carefully controlled engraving process without increasing to any great extent the cost of the final lens sheets and the engraving operation being facilitated by the ease with which the soft wax may be worked. Thus the scope of practical application of sheets produced according to the invention is very wide and it is contemplated that lenticulated sheets according to the present invention might be applied, for example to form the rear window of a motor car, where the window might be arranged to co-operate with the driving mirror arranged in front of the driving seat of the car, the lenticulated sheets from which the window is cut forming a "concave" lens so that the driver's angle of view through the mirror and lenticulated window is very greatly increased over the normal range of view through a plain rear window.

In using lenses formed according to the invention, it may be found advisable to insert a lens according to the invention between two plain sheets of a hard transparent material such as glass to afford the necessary mechanical protection or support to the lens. Alternatively, thin lenticular sheets produced according to the invention might be stuck on to one side of supporting glass or other transparent sheet.

It will be readily understood that certain of the features described notably the form of the cutting tools suggested as described with reference to Figures 2, 2a, 2b and 4 and the method of mounting the tool disclosed in Figures 2 and 3 are advantageous in cases where the lenticulated sheet is cut directly and not duplicated from a wax matrix and the tools shown may find application in cases where, for example, a series of parallel straight grooves are to be cut rather than concentric grooves as here described, the forms of the tools still retaining the advantages enumerated herein even when used to cut grooves in other than circular paths.

If desired dies for use in producing lenticulated sheets in accordance with the invention may also be prepared by hardening the engraved soft body instead of copying the engraving by electrotyping or by another equivalent method. For example, an engraving may be effected in a body of cellulose acetate which may be subsequently hardened by treatment with formalin or the soft body might be silica gel which could be hardened by treatment with acetic acid. In either case the hardened engraving might be used directly as a die.

We claim:

1. A projection screen for television comprising a planar transparent member having at least two substantially parallel faces, one of said faces having a plurality of concentric recesses therein, each of said recesses having substantially the same width in the plane of said one face and a radial cross-section of substantially sectorial shape with the centers of the sectorial radius of said recesses lying in the said one face, the arc of the sector constituting the outer wall of the recess with respect to the common center of said recesses, and further characterized by the fact that the angle of the radial boundary of said recesses with respect to the plane of the said one face increases progressively as the radial distance of said recesses from the common center of said recesses.

2. A projection screen for television comprising a planar transparent member having at least two substantially parallel faces, one of said faces having a plurality of concentric circular recesses therein, each of said recesses having substantially the same width in the plane of the said one face and a radial cross-section of substantially sectorial shape with the centers of the sectorial radius of said recesses lying in the said one face, the arc of the sector constituting the outer wall of the recess with respect to the common center of said recesses, and further characterized by the fact that the angle of the radial boundary of said recesses with respect to the plane of the said one face increases progressively as the radial distance of the said recesses from the common center of said recesses.

3. A projection screen for television comprising a planar transparent member having at least two substantially parallel faces, one of said faces having a continuous spiral recess therein, said recess having substantially the same width in the plane of said one face throughout its entire length and a radial cross-section of substantially sectorial shape with the centers of the sectorial radius of said recess lying in the said one face, the arc of the sector constituting the outer wall of the recess with respect to the common center of said recesses, and further characterized by the fact that the angle of the radial boundary of said recess with respect to the plane of the said one face increases progressively as the radial distance of said recess from the center of said spiral.

CECIL OSWALD BROWNE.
HERBERT EDWARD HOLMAN.